United States Patent Office 3,384,039
Patented May 21, 1968

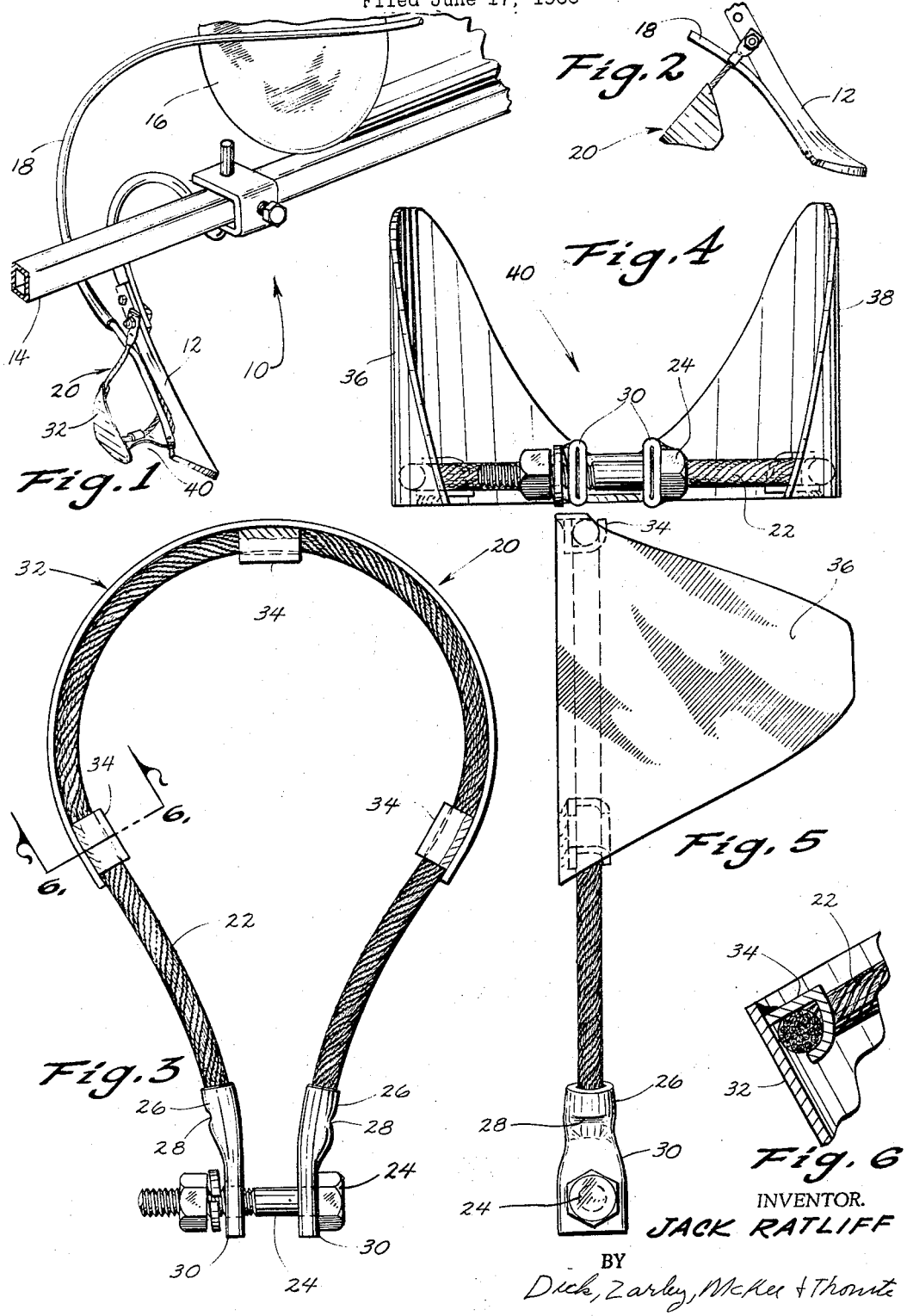

3,384,039
FERTILIZER APPLICATOR IMPLEMENT
Jack Ratliff, 2501 R St., Lincoln, Nebr. 68503
Filed June 17, 1966, Ser. No. 558,339
8 Claims. (Cl. 111—7)

ABSTRACT OF THE DISCLOSURE

A levelling device for levelling the ground after a furrow has been formed in the soil and fertilizer deposited therein, the soil leveller including a pair of multi-strand metal cable members secured to a member having a pair of spaced apart wings defining an opening therebetween. The multi-strand metal cable provides resiliency and also is sufficiently rigid to hold the leveller device at a predetermined position above the ground when the implement is raised above the ground.

---

Fertilizer such as anhydrous ammonia when deposited in the ground much be covered with soil to maximize the fertilizer's effectiveness.

It is one of the principal objects of this invention to provide a fertilizer applicator implement which includes a blade for forming a furrow, a fertilizer dispenser for placing fertilizer in the furrow and a leveller device for covering the fertilizer in the furrow.

It is a related object of this invention to provide a flexible leveller device which may be mounted on the blade frame.

A still further related object of this invention is to provide a leveller device which is flexible and is formed by a length of cable material formed in the shape of a loop with the free ends secured to blade frame and the loop being disposed in a plane extending transversely of the furrow being formed by the blade.

Yet another object of this invention is to provide a leveller device including a looped cable extending downwardly behind a soil blade and a pair of forwardly extending wing members being mounted on the sides of the cable to form therebetween an opening directly behind the soil blade.

Yet another related object of this invention is to provide a leveller device having a looped cable extending downwardly behind the soil blade and having wing members formed of sheet material and shaped to conform to the shape of the loop, and the wing members flaring outwardly from their forward ends.

A still further related object of this invention is to provide a fertilizer applicator implement having a transversely extending flexible leveller device which is selectively adjustably mounted for positioning the leveller device at the desired angle relative to the ground for covering the fertilizer in the furrow.

A further object of this invention is to provide a fertilizer applicator implement which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary perspective view of the fertilizer applicator implement;

FIG. 2 is a side elevation fragmentary view of the fertilizer applicator implement including the soil blade, fertilizer dispenser and soil leveller;

FIG. 3 is a top plan view of the soil leveller unit only;

FIG. 4 is an elevation end view of the soil leveller unit only;

FIG. 5 is a side elevation view of the soil leveller unit; and

FIG. 6 is a fragmentary cross-sectional view taken along line 6—6 in FIG. 3.

The fertilizer applicator implement of this invention is referred to generally in FIG. 1 by the reference numeral 10 and is shown to include a soil knife 12 mounted on an implement frame bar 14. A fertilizer tank 16 is also mounted on the implement frame and includes a hose 18 extending lengthwise of the blade 12 with its outlet end positioned behind the forward end of the soil blade. A leveller unit 20 is adjustably mounted on the soil blade rearwardly of the blade and the fertilizer tube.

The soil blade 12 is relatively narrow in width to form a furrow through the soil. The soil will normally be displaced outwardly of the blade 12 into ridges along the furrow. The fertilizer is then disposed in the furrow between the ridges of soil.

The soil leveller unit 20 includes a length of cable 22 which has its free ends secured together by a bolt 24 extending through the shank portion of the blade 12. The cable preferably is a wire type cable and is provided with end fastener elements 26 which are crimped at 28 onto the ends of the cable and are flattened at 30 to matingly engage opposite sides of the blade shank. Aligned openings are provided in the flattened ends 30 to receive the bolt 24. The end fasteners 26 may also be welded onto the ends of the cable 22. The length of cable 22 is formed into a loop by its two free ends being secured together as best seen in FIG. 3. A length of sheet metal 32 is shaped to extend the substantial length of the looped portion of the cable and project forwardly towards the soil blade 12. A plurality of tab elements 34 welded to the inner surface of the sheet material 32 are folded over the cable 22 to secure the sheet material to the cable as seen in FIG. 6.

Referring now to FIG. 4, it is seen that the sheet material 32 in the leveller unit 20 is shaped to provide a pair of wings 36 and 38 on the sides of the downwardly extending looped cable 22 and defining therebetween at the bottom of the looped portion of the cable an opening 40 which has a longitudinal center aligned with the tip end of the blade 12 (FIG. 1). The opening 40 flares outwardly from the cable 22 while the wing members 36 and 38 flare outwardly from their outer tip ends towards the cable 22. The sheet material 32 is integral along its length along the looped portion of the cable 22 but at the longitudinal center of the opening 40 the sheet material has substantially the width of the cable and thus readily permits flow of the soil through the looped portion of the cable.

It is seen that in operation that the ridges of soil formed by the blade 12 on opposite sides of the furrow will be engaged by the wings 36 and 38 of the leveller 20 and be directed into the opening 40 extending through the looped portion of the cable and thus fill in or cover up the furrow containing the fertilizer from the tank 16. Should the leveller unit 20 engage an obstruction or the like, the cable being flexible will permit the leveller to deflect sufficiently to ride over the obstruction. The specific design of the sheet material and cable are such that the unit is substantially self-cleaning even when being operated in soil containing trash such as weeds or the like. By appropriate adjustment of the bolt 24 and positioning of the leveller unit 20, the leveller unit may be placed at the desired angle relative to the ground and the angle of the blade 12. This adjustment will permit varying the amount of soil that is placed in the knife track or furrow. Thus it is seen by this simplified fertilizer applicator implement that the soil leveller unit may be readily attached to conventional equipment if desired to obtain the appropriate levelling of the soil to maximize the effectiveness of the fertilizer being applied in the blade furrow.

Some changes may be made in the construction and arrangement of my fertilizer applicator implement without departing from the real spirit and purpose of my invention, and it is my intention to cover by my claims, any modified forms of structure or use of mechanical equivalents which may be reasonably included within their scope.

I claim:

1. A fertilizer applicator element, comprising a frame, a soil blade secured to said frame for forming a furrow through the soil, a fertilizer dispenser secured to said frame for placing fertilizer in the furrow, and a soil leveller secured to said frame behind said blade for closing said furrow, said fertilizer dispenser being positioned to place said fertilizer directly behind said blade, said leveller including a flexible support for securing said leveller to said frame, said flexible support being a length of cable formed into a downwardly extending loop with its free ends being secured to said frame, said cable loop being disposed in a plane extending transversely of said furrow and said soil leveller including a sheet of rigid material secured to said looped end of said cable and extending forwardly towards said blade.

2. The structure of claim 1 wherein said sheet material is shaped to conform to the shape of said loop.

3. The structure of claim 1 wherein said sheet material includes a pair of spaced apart wings disposed on opposite sides of the bottom of said loop and defining an opening therebetween at the bottom of said loop.

4. A fertilizer applicator implement, comprising a frame, a soil blade secured to said frame for forming a furrow through the soil, a fertilizer dispenser secured to said frame for placing a fertilizer in the furrow, and a soil leveller secured to said frame behind said blade for closing said furrow, said fertilizer dispenser being positioned to place said fertilizer directly behind said blade, said leveller including a support for securing said leveller to said frame, a sheet of rigid material secured to said support, said sheet and said support forming a loop, said support including metallic flexible and resilient first and second cables secured at one of their ends to said frame and having their opposite ends secured to said sheet.

5. The structure of claim 4 wherein said cables are sufficiently rigid to support the weight of said sheet member at angle to the vertical, and said cables are sufficiently resilient and flexible to permit said sheet member to be displaced upwardly as said sheet member moves over obstructions on the ground.

6. The structure of claim 4 wherein said sheet material includes a pair of spaced apart wings interconnected at their lower edges opposite said first and second cables and defining an opening therethrough and therebetween whereby the forward edges of said wings deflect dirt laterally inwardly and rearwardly through said opening.

7. The structure of claim 6 wherein said wings each have forward ends which taper laterally inwardly and downwardly and rearwardly to a point intermediate said wings along the bottom of said wings where said wings are interconnected.

8. The structure of claim 7 wherein said wings are each concave in shape and face inwardly towards each other.

References Cited

UNITED STATES PATENTS

| | | | |
|---|---|---|---|
| 738,364 | 9/1903 | Simonds et al. | 111—85 |
| 2,736,279 | 2/1956 | Johnston | 111—7 |
| 2,990,186 | 6/1961 | Gandrud | 111—10 X |

ROBERT E. BAGWILL, *Primary Examiner.*